United States Patent

[11] 3,610,225

| [72] | Inventor | Merle J. Schwantes<br>723 Ginger Drive, Long Beach, Calif. 90805 |
|---|---|---|
| [21] | Appl. No. | 24,107 |
| [22] | Filed | Mar. 31, 1970 |
| [45] | Patented | Oct. 5, 1971 |

[54] COLLAPSIBLE SELF-EXTINGUISHING BARBECUE UNIT
6 Claims, 7 Drawing Figs.

[52] U.S. Cl. .................................................. 126/25 R, 126/9 R
[51] Int. Cl. ....................................................... A47j 37/00, F24b 3/00, F24c 1/16
[50] Field of Search .................................... 126/9, 25, 25 A, 25 B, 38

[56] References Cited
UNITED STATES PATENTS

| 811,294 | 1/1906 | Hiller | 126/9 |
|---|---|---|---|
| 2,556,365 | 6/1951 | McKnight, Jr. | 126/25 A X |
| 3,096,706 | 7/1963 | Cardwell | 126/25 A X |
| 3,285,238 | 11/1966 | Norlie | 126/9 |
| 3,375,816 | 4/1968 | Chesnut, Jr. | 126/25 |
| 3,490,433 | 1/1970 | Busenbarrick | 126/9 |

*Primary Examiner*—Charles J. Myhre
*Attorney*—William C. Babcock

ABSTRACT: A lightweight portable barbecue unit that may be transported to a desired location in a compact collapsed condition, and at the location expanded to provide a barbecue unit that serves not only that function, but by use of conventional accessories may be transformed to a rotisserie, or if desired the unit may be used for the smoking of fish or meats.

The unit includes a metal heat conducting plate that may be so adjustably mounted thereon as to provide either a grill or warming surface, and the plate after the barbecue operation is completed being so disposable on the unit as to automatically extinguish the briquettes or other fuel used in the operation thereof, with the extinguished briquettes or fuel capable of being used in a future barbecueing operation.

PATENTED OCT 5 1971 3,610,225
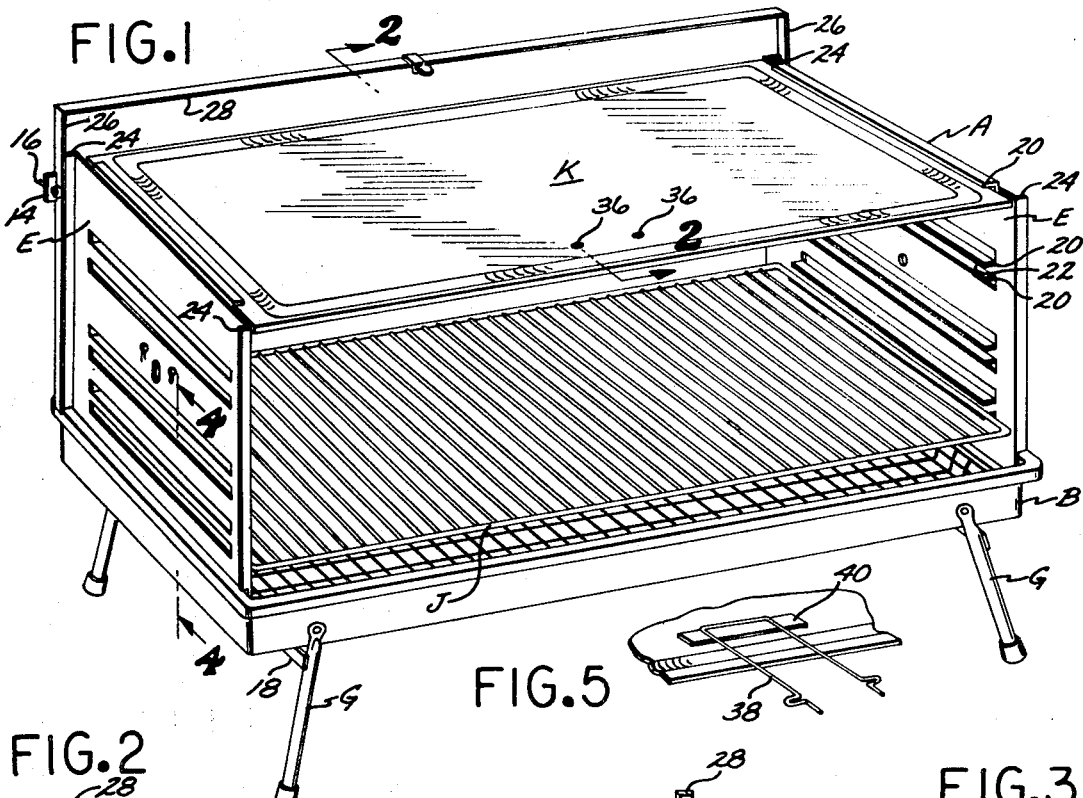
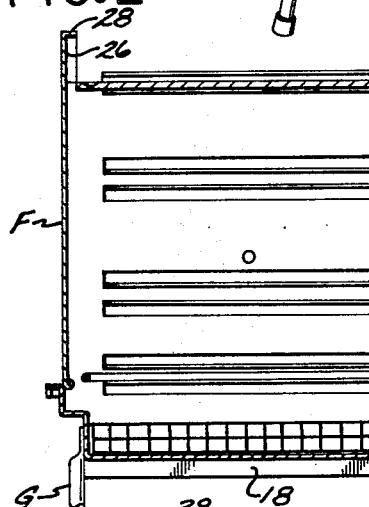
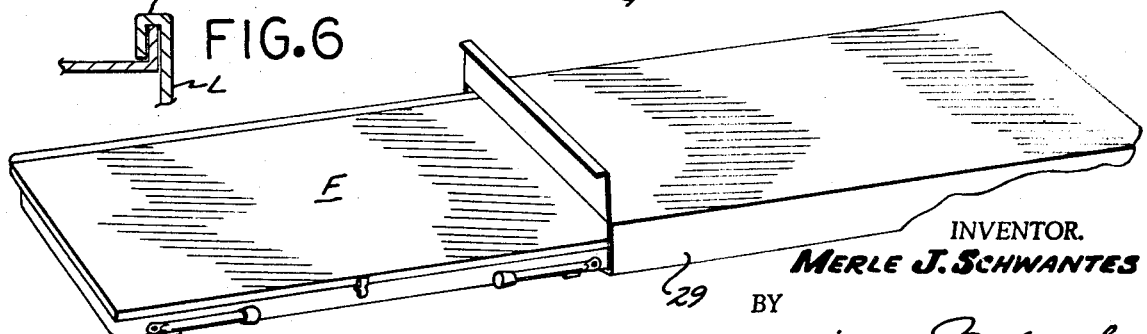
INVENTOR.
MERLE J. SCHWANTES
BY
William G. Babcock
ATTORNEY

COLLAPSIBLE SELF-EXTINGUISHING BARBECUE UNIT

BACKGROUND OF THE INVENTION

1. Field of the Invention
Collapsible Self-Extinguishing Barbecue Unit
2. Description of the Prior Art In the past few years the popularity of barbecuing and cooking various forms of food products in the open has increased, and numerous barbecue units have been devised and sold commercially to permit such operations to be conducted. The major portion of such barbecue units are of a fixed, rigid configuration, are bulky and difficult to transport as well as to store when not in use, provide a fire hazard when used in either a wooded area or open area adjacent thereto, and require an excessive quantity of fuel to be used in each barbecuing operation.

The purpose in devising the present invention is to supply a lightweight, compact, collapsible self-extinguishing barbecue unit that may be easily transported to a desired location for use, and when used, will overcome many of the original disadvantages of prior art devices of this nature.

SUMMARY OF THE INVENTION

A collapsible barbecue unit that includes a substantially rectangular firebox that is supported at a desired elevation above the ground by pairs of legs that are pivotally secured to the lower portion thereof or by other supporting means of a conventional nature that are used either with or without the above-mentioned legs. The unit includes two end pieces and a back piece that are hingedly connected to the ends and rear edge of the firebox and may be pivoted to upright positions and removably locked therein. The end pieces have a number of vertically spaced pairs of flanges on the inner faces thereof, which pairs of flanges may be removably engaged by a wire grill to support the latter in a desired elevation above the firebox, or by a rectangular first plate that serves either as a warming surface when disposed as shown in FIG. 1, or as in a fuel extinguishing device when used as illustrated in FIG. 3. The unit may also include a second plate that removably interlocks with the forward vertical end extremities of the end pieces, and cooperate with the backpiece, end pieces and first plate to define a confined space above the firebox in which fish or meat products may be smoked.

A major object of the present invention is to provide a lightweight portable barbecue unit that may be transported in a collapsed condition to a desired location, with the unit at such location capable of being expanded to provide a device that may not only be used for barbecuing, but by the use of conventional accessories may be used as a rotisserie. Also, the unit provides means for either grilling food products or maintaining certain food products in a warmed condition during a barbecuing operation.

Another object of the invention is to provide a barbecue unit in which a first plate serves not only as a grill, but as a warming surface, and the first plate after the barbecuing operation is completed capable of being so disposed on the unit as to extinguish the briquettes or fuel used, and the extinguished briquettes or fuel capable of being used in a future barbecuing operation.

BRIEF DESCRIPTION OF THE DRAWING

FIG. 1 is a perspective view of the barbecue unit in an expanded usable condition;

FIG. 2 is a transverse vertical cross-sectional view of the device shown in FIG. 1 taken on the line 2—2 thereof, and with a first metallic heat-conducting plate being so disposed on the unit to act as a warming surface;

FIG. 3 is the same transverse cross-sectional view shown in FIG. 2 but with the first plate having moved to a position to extinguish the briquettes or fuel in the firebox;

FIG. 4 is a fragmentary vertical cross-sectional view of one of the end pieces of the unit and taken on the line 4—4 of FIG. 1;

FIG. 5 is a fragmentary perspective view of the handle used in moving the first metallic plate from a first position as shown in FIG. 1 to a fuel extinguishing position as illustrated in FIG. 3;

FIG. 6 is a fragmentary horizontal cross-sectional view of an end portion of a second plate that is used when the barbecue unit is desired to be employed as a fish or meat-smoking device; and FIG. 7 is a perspective view of the barbecue unit illustrated in FIG. 1 after the unit has been collapsed, and is to be carried to a different location in a carton or container of compact configuration.

DESCRIPTION OF THE PREFERRED EMBODIMENT

The barbecue unit A as may best be seen in FIG. 1 includes a rectangular firebox B in which a wire basket C may be disposed. The basket C is adapted to hold a number of briquettes D or other chunk-type fuel. Two end pieces E are connected to the upper end portions of the firebox B by hinges 10 as may best be seen in FIG. 4. A back piece F is connected to the rearward portion of the unit A by hinges 12 as shown in FIG. 3.

The end pieces E on the rearward portions thereof have tabs 14 projecting therefrom, which tabs have openings (not shown) therein through which pins 16 contact the back piece F, and maintain the end pieces E and back piece F in the upright positions shown in FIG. 1. The firebox B has two pairs of legs G secured thereto as shown in FIG. 1, with each pair of legs supporting a transverse bar 18 that serves not only to reinforce the legs, but acts as a stop when in contact with firebox B to prevent the legs pivoting outward from one another beyond a desired degree.

The two end pieces E as may be seen in FIG. 1 have a number of longitudinally aligned pairs of ribs 20 mounted on the interior surface thereof, with each pair of ribs defining a transverse space 22 therebetween. The forward and rearward vertical edges of the end pieces E develop into outwardly projecting flanges 24. The end edges and one side edge of the backpiece F have flanges 26 and 28 respectively projecting therefrom. It will be particularly noted that the hinges 12 are located a substantial distance above the hinges 10, to permit the end pieces E to be pivoted downwardly to position adjacent the firebox B, and the backpiece F then pivoted downwardly to overlie the end pieces. When the end pieces E have been so pivoted downwardly and the back piece F caused to overlie the same, the legs G may be pivoted upwardly to the position shown in FIG. 7, whereupon the barbecue unit A is in a compact configuration and may be easily slipped into a flat carton 29 for transportation to a desired location.

The firebox B is preferably formed as an integral unit from sheet metal and includes a flat bottom 30, forward and rearward sidewalls 32 and end walls 34. The sidewalls and end walls 32 and 34 at their upper ends develop into horizontal outwardly projected extensions 32a and 34a, and these extensions 32a and 34a on their outer ends develop into short upwardly extending walls 32b and 34b that are of inverted J-shaped transverse cross section. The hinges 10 as may best be seen in FIG. 4 are located adjacent the transsection of the extensions 34a and the walls 34b. Hinges 12 are located on the upward inner extremities of the walls 32b as best seen in FIG. 3.

The bottom 30, sidewalls 32 and end walls 34 are preferably lined with a covering of asbestos material, or other heat-resisting coating H, to prevent damage to the firebox during the operation thereof. A wire grill J of rectangular shape is provided that may removably engage two of the longitudinally aligned spaces 22 defined by the flanges 20 on the end piece E to support the grill at a desired elevation above the briquettes D. The grill J, of course, serves as a support for the barbecuing of steaks or other food products (not shown) above the bed of coals provided by the briquettes D. A rectangular plate K is provided that is formed from a heat-conducting material such as aluminum or the like, and like the grill J may engage any desired pair of the aligned openings 22. In FIG. 1 the first plate K is shown at a maximum elevation above the briquettes D, and at that position serves as a warming surface. However, if desired the plate K may be positioned at a lower elevation relative to the briquettes D, and in that position provide a heated surface on which foods may be grilled. The plate K as may best be seen in FIG. 1 has two openings 36 in the forward portion thereof. The openings 36 are adapted to be removably engaged by the forward extremities of a U-shaped handle 38, which handle includes a flat elongate bar 40. After a barbecuing operation has been completed, the end extremities of the handle 38 are caused to removably engage the openings 36, to permit the plate K to be removed from engagement with the flanges 20. The plate K may now be moved by the handle 38 to a position within the confines of the barbecue unit A below the lowermost pairs of flanges 20, and caused to rest on the upper surface of the extensions 32a as shown in FIG. 3. Prior to the plate K being so disposed, it is preferable that the grill J be removed from the position in the barbecue unit as shown in FIG. 1 and placed in an elevated position within the barbecue unit A as shown in FIG. 3.

Should it be desired to smoke fish or other food products when the barbecue unit is in the expanded position as shown in FIG. 1, a rectangular sheet L is provided of sufficient length to span the open forward portion of the barbecue unit. The sheet L has vertically extending end portions 38 of transverse U-shaped cross section, and these end portions slidably engaging the flanges 24. By the use of the sheet L, a completely confined space is provided within the barbecue unit A in which the smoking operation may be carried out.

When the smoking operation is conducted, the flat plate 40 is caused to rest on the upper surface of the plate K and either completely or partially cover the openings 36 depending on the amount of draft that is desired for the fuel during the smoking operation. The end pieces E also have openings therein that permit air from the ambient atmosphere to pass into the confines of the barbecue unit A to permit combustion of the briquettes D. After the plate K has been disposed within the confines of the barbecue unit A as shown in FIG. 3, the flow of the air from the ambient atmosphere to the briquettes D is terminated, and the briquettes are extinguished in a matter of seconds due to lack of oxygen.

After the extinguished briquettes D have cooled, the basket C may be removed from the firebox B, and by a shaking operation ashes separated from the briquettes. The briquettes may now be stored in the unit A for future barbecuing operations or in a sack or other desired storage receptacle. The pins 16 are removed from the tabs 14 after the briquettes have been extinguished and allowed to cool. The grill J and plate are now removed, and the end pieces E pivoted downwardly to overlie the fire box B. Backpiece F is now pivoted downwardly to overlie end pieces E.

The barbecue unit A is now in the compact configuration shown in FIG. 7, and is adapted to be slidably inserted within the carton or carrying case 29. The legs G are of tubular construction, and if desired additional legs of tubing (not shown) may be provided to removably engage the lower portion of the legs G to support the barbecue unit A at a greater elevation above a desired surface.

I claim:

1. A portable, collapsible, self-extinguishing barbecue unit comprising, in combination:
    a. a rectangular pan-shaped firebox defined by a bottom, end walls and sidewalls, said end walls and sidewalls cooperating to define a continuous flat surface parallel to said bottom and situated at a substantial elevation thereabove;
    b. two rectangular end pieces hingedly supported from said end walls;
    c. a rectangular back piece hingedly supported from a rearward one of said sidewalls;
    d. a plurality of pairs of transverse spaced flanges that project inwardly towards one another from first surfaces of said end pieces when said end pieces are pivoted to positions substantially normal to said bottom, with each of said pair of flanges defining an elongate space therebetween;
    e. means for removably locking said end pieces in upwardly extending positions relative to said firebox to define a partial enclosure thereabove;
    f. a rectangular wire basket in which briquettes are disposed, said basket being supported in said firebox, and said basket of such depth that the upper extremities thereof are situated below said flat surface;
    g. a rectangular wire grill that may selectively engage said elongate spaces to be supported at a desired elevation above said firebox; and
    h. a rectangular heat-conducting plate that may selectively engage said elongate spaces to provide either a warming surface or a cooking surface, and said plate after a barbecuing operation has been completed capable of being disposed to rest on said flat surface to extinguish said briquettes by preventing oxygen from the ambient atmosphere reaching said briquettes, and said unit capable of being collapsed into a compact configuration after a barbecuing operation by pivoting said end pieces to overlie said firebox, and said backpiece folded downwardly to extend over said end pieces.

2. A barbecue unit as defined in claim 1 which in addition includes:
    i. two pairs of legs pivotally connected to said firebox for supporting said unit at a desired elevation above a fixed horizontal surface.

3. A barbecue unit as defined in claim 1 which in addition includes:
    i. two flanges that extend outwardly in opposite directions from the forward extremities of said end pieces when said end pieces are normally disposed to said bottom of said firebox; and
    j. a rectangular sheet having ends of transverse U-shaped cross section that slidably engage said flanges, and cooperate with said firebox, end piece, back piece, and said plate to define a completely enclosed confined space in which fish or other food products may be smoked.

4. A barbecue unit as defined in claim 3 which in addition includes:
    k. a U-shaped wire handle that includes a transverse flat bar, with the forward extremities of said handle capable of removably engaging a pair of holes in the forward portion of said plate to permit said plate to be moved to a briquette extinguishing position in said unit, and said bar capable of being rested on the upper surface of said plate when said plate is at an elevated position on said unit to either completely or partially close said openings to regulate the flow of air from the ambient atmosphere to said briquettes.

5. A barbecue unit as defined in claim 1 which in addition includes:
    i. a fire-resistant layer on the interior of said firebox.

6. A barbecue unit as defined in claim 1 which in addition includes:
    i. a flat rectangular carton in which said unit may be removably disposed for carrying when said unit is in a collapsed condition.